April 30, 1940.  F. REDMAN  2,198,740
APPARATUS FOR ASSEMBLING THE PARTS OF CLOSURE CLAMPING DEVICES
Filed Sept. 19, 1938  4 Sheets-Sheet 1
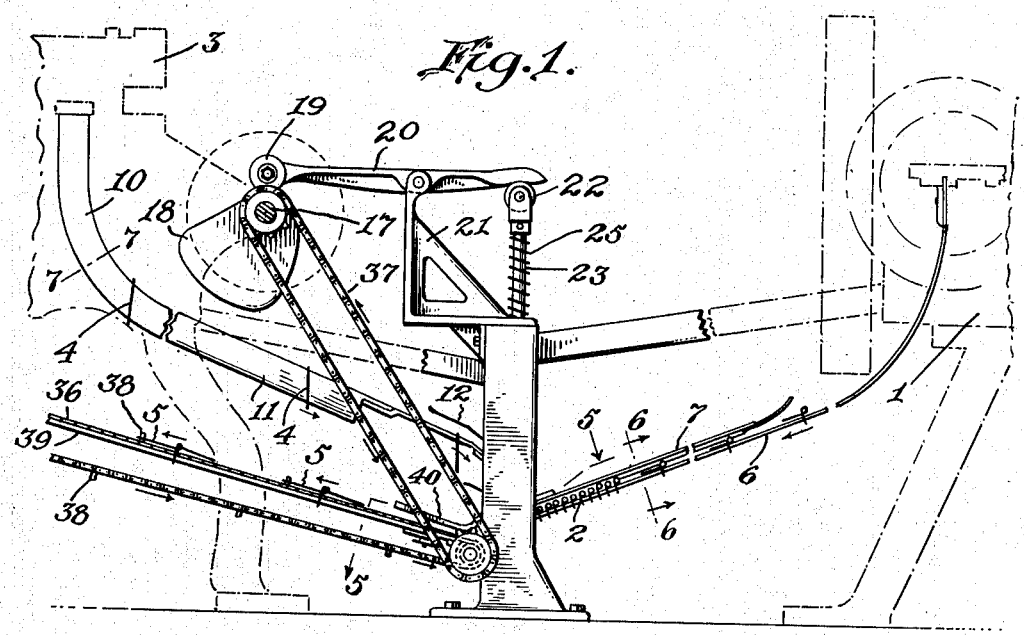
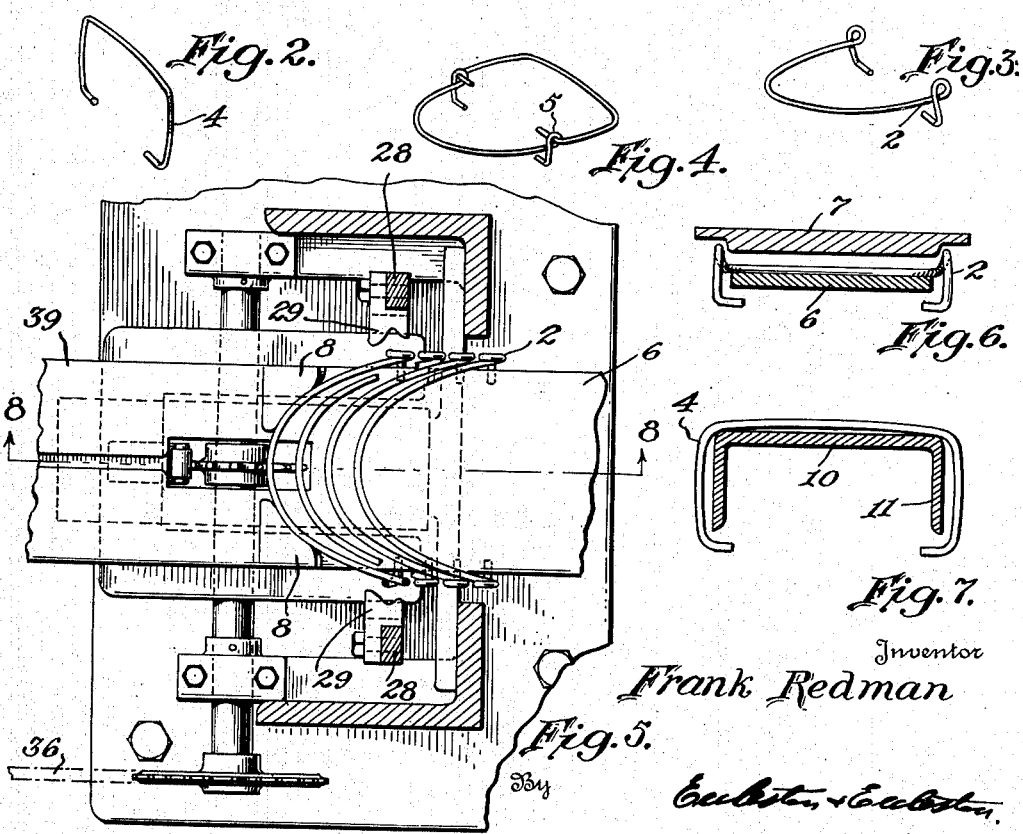
Inventor
Frank Redman
By
Attorneys

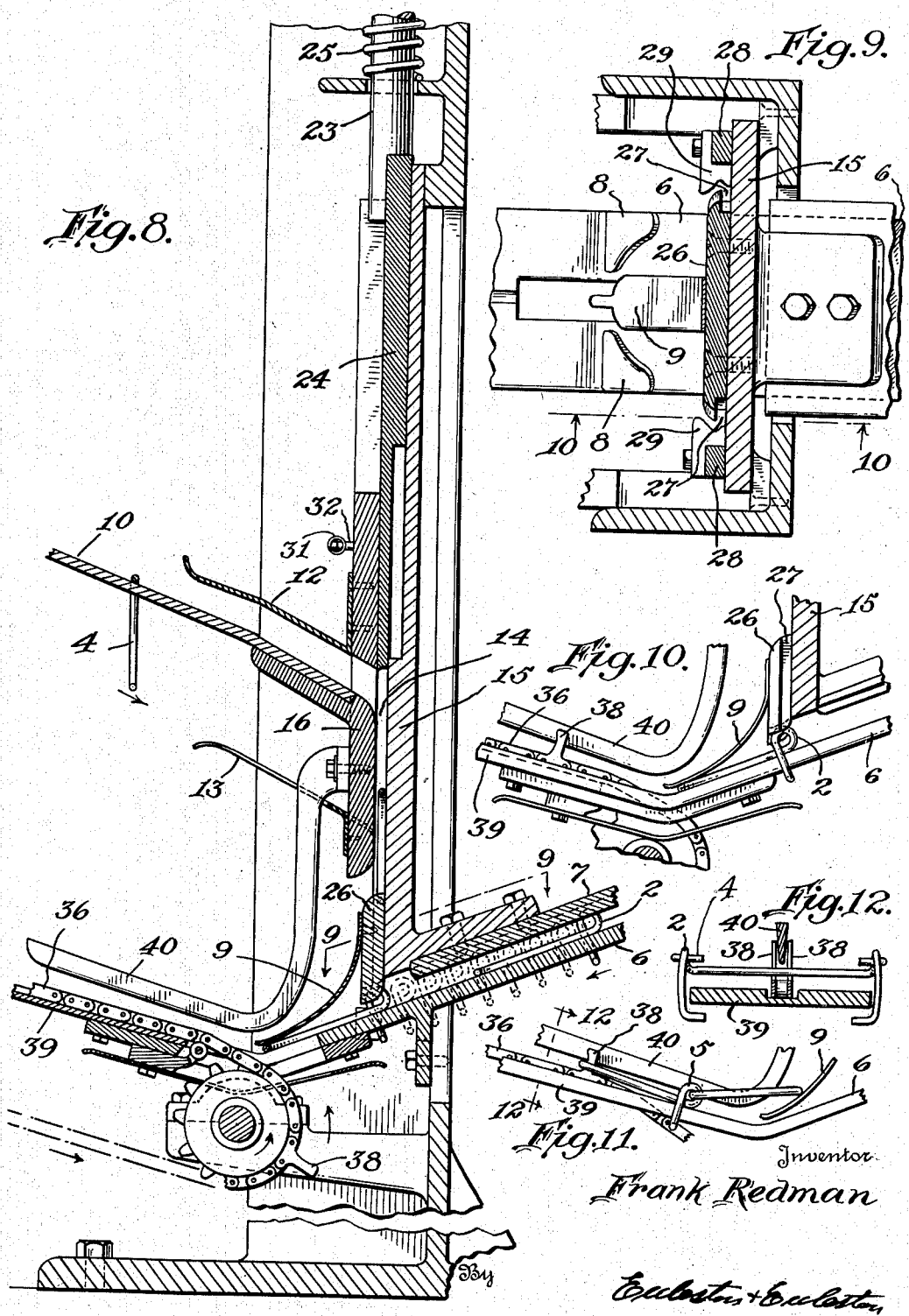

April 30, 1940.    F. REDMAN    2,198,740
APPARATUS FOR ASSEMBLING THE PARTS OF CLOSURE CLAMPING DEVICES
Filed Sept. 19, 1938    4 Sheets-Sheet 4

Inventor
Frank Redman
By
Eccles+Babs
Attorneys

Patented Apr. 30, 1940

2,198,740

UNITED STATES PATENT OFFICE 2,198,740

APPARATUS FOR ASSEMBLING THE PARTS OF CLOSURE CLAMPING DEVICES

Frank Redman, Washington, Pa., assignor to Hazel-Atlas Glass Company, Wheeling, W. Va., a corporation of West Virginia Application September 19, 1938, Serial No. 230,634

13 Claims. (Cl. 140—75)

The invention relates to an apparatus for assembling the parts which form closure fasteners or closure clamping devices. One well known form of clamping or fastener device for closures, consists of a wire bail which passes over the glass or other closure on the container, and an eccentric which is pivotally attached to the container and connected with the bail. The arrangement is such that when the eccentric is rotated downwardly to the locking position the bail is also drawn down, and it thereby forces the closure down and locks it securely in sealing position.

The bail member and the eccentric member are of course manufactured by different machines, and these parts are united to form complete clamps or fasteners before they are applied to the jars or other containers.

Prior to the present invention these parts have been united by hand. Of course the hand assemblage was rather slow, and the operation would often be delayed by the bails becoming entangled among themselves, and by the eccentrics becoming entangled among themselves.

The present invention provides an apparatus by which the bails as formed by the forming machine are delivered to a point in proper position to be united with the eccentrics, by which the eccentrics as formed by the forming machine are delivered to a point ready to be united with the bails, and by which the bails and eccentric so delivered are automatically united.

It will be apparent, of course, that the uniting of the parts is accomplished far more quickly than is possible by hand, that no entangling of the parts is possible, and that there is a great saving of hand labor.

Various other advantages of the invention will be apparent to those skilled in the art, from the following detailed description when taken in connection with the accompanying drawings in which, Figure 1 is a side elevational view of the apparatus.

Figure 2 is a perspective view of a bail such as is ordinarily united with an eccentric to form a closure clamp.

Figure 3 is a perspective view of an eccentric such as ordinarily used.

Figure 4 is a perspective view of a clamp or fastener formed by uniting a bail and eccentric.

Figure 5 is a horizontal sectional view of the apparatus taken on line 5—5 of Figure 1.

Figure 6 is a vertical sectional view of the eccentric delivery slide or conveyor, taken on line 6—6 of Figure 1.

Figure 7 is a vertical sectional view of the bail delivery slide or conveyer, taken on line 7—7 of Figure 1.

Figure 8 is a vertical sectional view of the apparatus for uniting the eccentrics and bails, and associated parts of the apparatus.

Figure 9 is a horizontal sectional view, taken on line 9—9 of Figure 8.

Figure 10 is a fragmentary sectional view, taken on line 10—10 of Figure 9.

Figure 11 is a fragmentary elevational view of the conveyer and associated parts for carrying off the completed clamps.

Figure 12 is a detail sectional view taken on line 12—12 of Figure 11.

Figure 13:
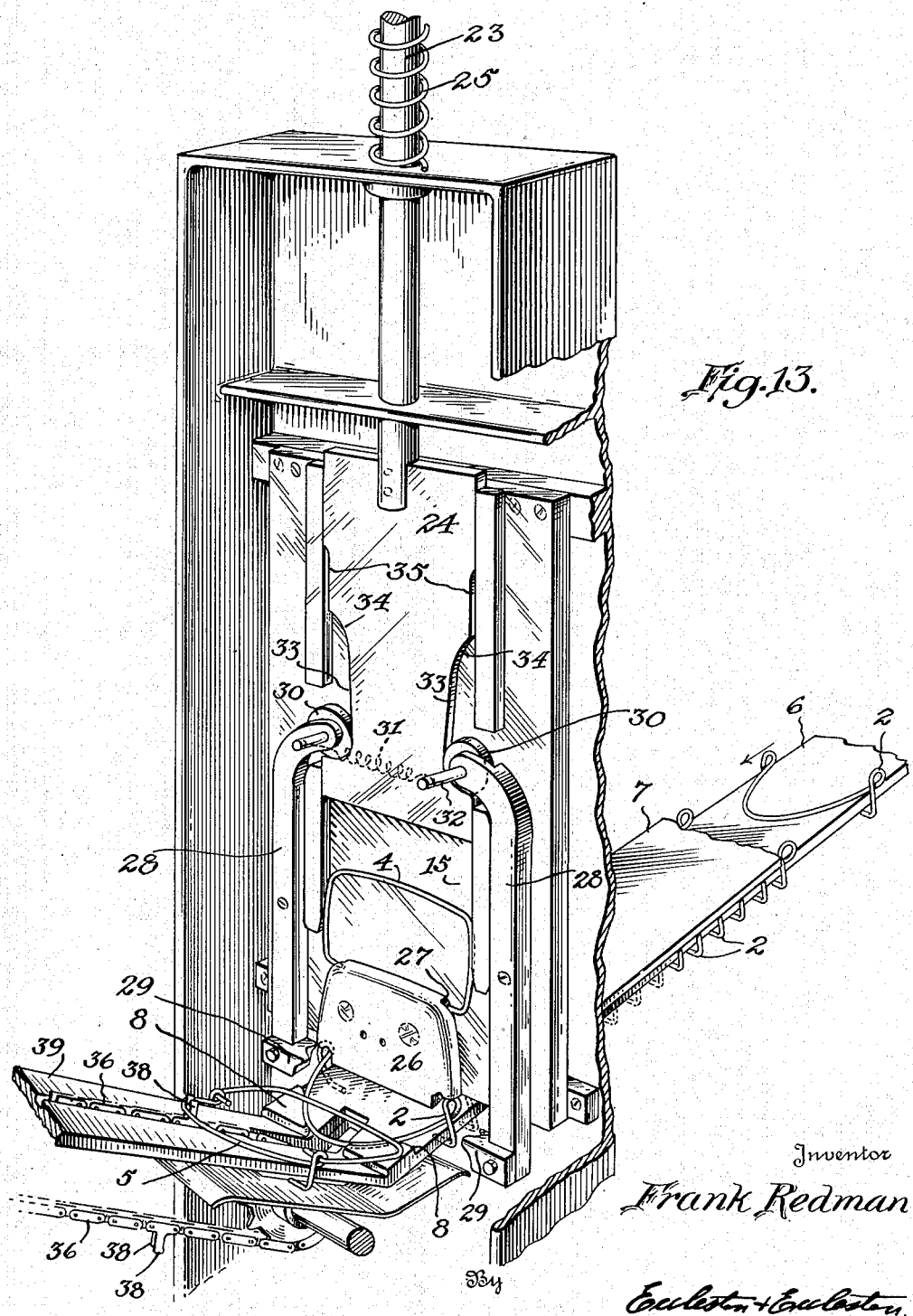
Figure 13 is a perspective view of the apparatus for uniting the bails and eccentrics, with various parts of the apparatus removed for the sake of clearness.

Referring to the drawings in more detail, numeral 1 indicates an eccentric forming machine, which is illustrated diagrammatically as it forms no part of the present invention. The eccentrics formed by this machine are referred to by numeral 2. The bail forming machine, which is also illustrated diagrammatically, is referred to by numeral 3, and numeral 4 indicates the bails formed thereby. A complete closure fastener or clamping device, formed by uniting a bail and an eccentric, is shown in Figure 4 and is referred to by numeral 5.

Leading from the eccentric forming machine is a conveyer or chute 6, which receives the eccentrics from the forming machine and conveys them to a point where they are united with the bails. It will be noted, by reference to Figures 1 and 5, that the eccentrics travel down the chute with the loop portion in advance and with the eyes projecting upwardly. In order to steady the eccentrics and to prevent them from becoming tangled as they slide down the chute, a plate 7 is preferably arranged over the lower portion of the chute. It may be mentioned here that the eccentrics are delivered to the chute as formed, and without any timing in relation to the operation of the machine. As will appear more clearly hereinafter, the eccentrics accumulate at the lower end of the chute, and each one slips into position to be assembled as soon as a preceding one has been assembled with a bail, and hence no timing of the delivery of the eccentrics is necessary.

The lower end of the chute is provided with stops 8, and these are so positioned that when the loop portion of the leading eccentric engages the stops, the eyes of that eccentric will be accurately positioned for subsequent operations. Of course any desired means may be employed for stopping the eccentrics at the desired point, but in the form illustrated the stops are simply spaced lugs having faces of substantially the same curvature as that of the eccentric loops. Figure 5 illustrates how the leading eccentric is positioned by its loop engaging the spaced lugs 8, and how the following eccentrics automatically position themselves, one against the other, as they slide down the chute. As soon as the leading eccentric is united with its bail, the next eccentric drops into place adjacent the stop lugs. When the eccentrics are positioned as described above, of course the eyes are projecting upwardly above the chute, in position to receive the bail ends, as will more clearly appear hereinafter. In order to steady the leading eccentric and maintain it in position during the uniting operation there is preferably provided a leaf spring 9 which lightly engages the eccentric loop.

Numeral 10 refers to a chute or conveyor which receives the bails 4 from the bail forming machine and carries them to the point where they are to be united with the eccentrics. This chute preferably has downwardly extending flanges 11 under which the inturned ends of the bails extend, whereby the movement of the bails is steadied in their rapid travel down the chute. Also for the purpose of keeping the bails in position on the chute, as they approach the lower end thereof, I preferably provide guides or guards 12 and 13, respectively above and below the chute.

Figure 14:
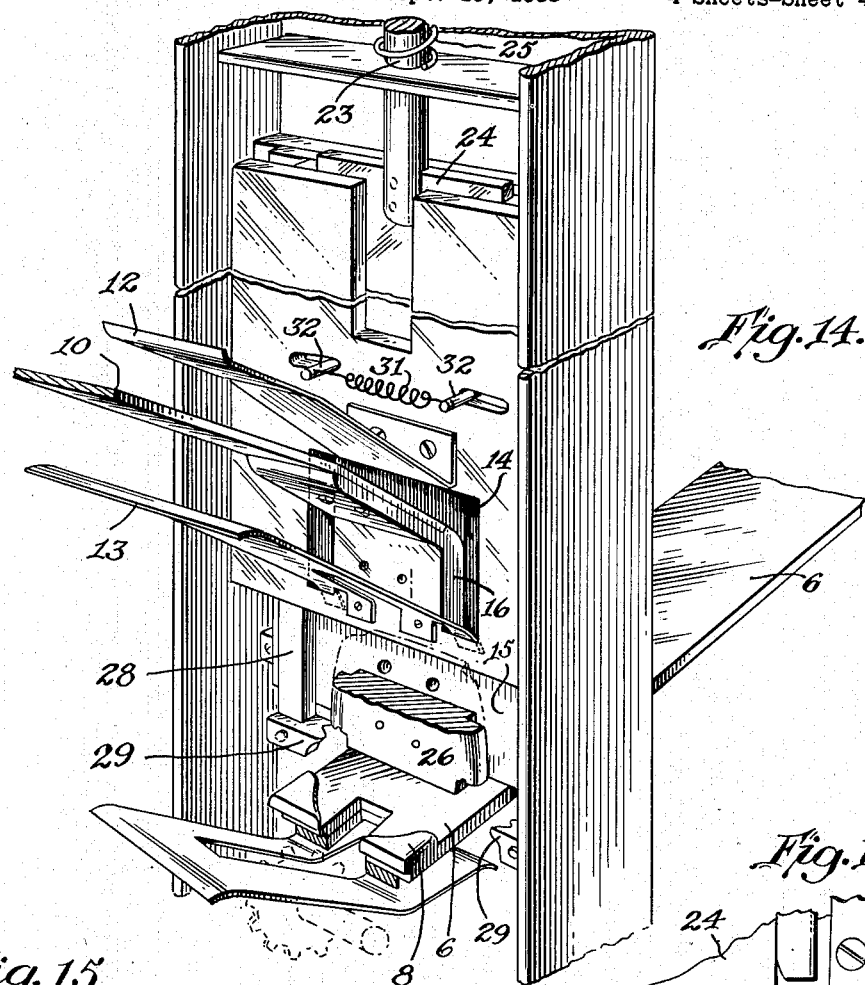
Figure 14 is a perspective view of the apparatus, taken from the bail delivery side.

As the bails successively reach the lower end of the chute they drop vertically down a passage 14 formed by the two spaced walls 15 and 16, as clearly shown in Figures 8 and 14. The movement of the bail down the passage 14 is stopped by the inturned ends of the bail engaging an expanding die, as will be described more fully hereinafter, and as shown in Figures 8 and 13.

As mentioned hereinbefore the bails are delivered from the bail forming machine to the chute 10, and preferably the delivery of the bails is in synchronized relation with the operation of the apparatus for uniting the bails and eccentrics. In order that the delivery of the bails to the chute may be timed with the operation of the uniting apparatus, both machines may be operated from a common shaft 17.

Of course it is unnecessary to illustrate any connections between the shaft 17 and the bail forming machine, as such machine forms no part of the present invention. For operating the uniting apparatus, a cam 18 is carried by the shaft 17. Riding on the cam is a roller 19 carried by one end of a lever 20 pivotally mounted, between its ends, on a bracket 21. The opposite end of the lever is arranged over a roller 22 on the upper end of a rod 23. Attached to the lower end of the rod 23 is a plunger 24 which actuates various parts of the uniting apparatus, as will clearly appear hereinafter. The plunger 24 and rod 23 are normally maintained in elevated position by a coil spring 25 mounted on the rod. Thus as the shaft 17 rotates the cam 18 will cause the plunger 24 to be moved downward, and upon further rotation of the shaft the spring 25 will elevate the plunger; there being one complete operation of the uniting apparatus for each rotation of the shaft 17. This shaft also preferably operates a conveyor for carrying off the completed closure fasteners, as will later appear.

As previously described, the leading eccentric has been positioned by its loop engaging the stop lugs 8; and a bail has dropped down the passage 14, ready to be united with the eccentric. The preferred means for uniting these two parts will now be described.

The expanding die is referred to by numeral 26. This die is attached to the wall 25, and the sides of the die are cut away, as best shown in Figure 9, to form passages or grooves 27 between the die and the wall 15. Of course these passages or grooves extend downwardly and outwardly, so as to expand the bail.

When a bail drops down the passage 14, the inturned ends of the bail engage the upper ends of the expanding grooves 27 of the die 26, as shown in Figures 8 and 13. The continued operation of the cam 18 now causes a downward movement of the rod 23 and plunger 24, whereby the lower end of the plunger engages the top of the bail.

The plunger continues its downward movement, thereby causing the bail to move downwardly, with the inturned ends of the bail travelling down the grooves 27. Thus the inturned ends are moved apart or expanded.

Before the bail ends reach the lower ends of the grooves, the eccentric with which it is to be combined, is preferably compressed. For the purpose of performing the compressing action, levers 28 are pivotally mounted on the wall 15. The lower ends of the levers are provided with fingers 29, which are adapted to engage the sides of the eccentric below the eyes thereof, as shown in Figures 13 and 15.

The upper arms of the levers 28 are provided with rollers 30 which are held in engagement with the sides of the plunger 24 by means of a coil spring 31 having its ends attached to pins 32 projecting from the upper ends of the levers. Particularly by reference to Figure 13, it will be noted that the plunger 24 has straight sides 33, above which the sides of the plunger flare outwardly, as indicated by numeral 34, and above the flared portions, the sides of the plunger are straight, as indicated by numeral 35.

Thus when the plunger first starts its downward movement, it has no effect upon the levers 28, as the rollers 30 are in engagement with the straight portions 33 of the plunger. The continued descent of the plunger brings the flared portions 34 into engagement with the rollers 30, thereby moving the upper ends of the levers 28 outwardly and the lower ends inwardly. This inward movement of the lower ends of the levers occurs before the bail reaches the lower end of the expanding grooves 27.

Figure 15:
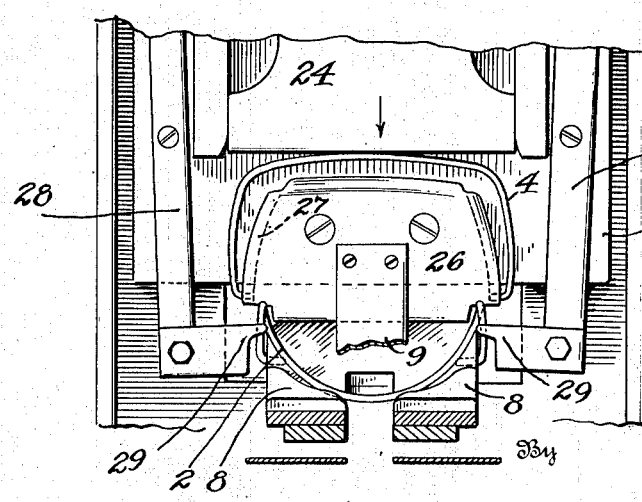
Figure 15 is an enlarged fragmentary view of the expanding die and compressing levers by which the bails and eccentrics are united; and showing these parts in position ready to be snapped together.

When the lower ends of the levers are moved inwardly, as described above, the fingers 29 engage the sides of the eccentric below the eyes, and thus compress the eccentric, so that the eyes are moved toward each other, as shown in Figure 15.

Figure 16:
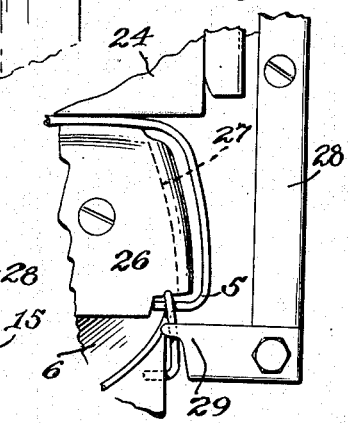
Figure 16 is an enlarged fragmentary view illustrating the parts sprung together to form a complete closure fastener or clamping device.

The further continued descent of the plunger has no effect upon the levers 28, as the rollers 30 are now in engagement with the straight portions 35 of the plunger 24. But the continued descent of the plunger does cause the continued downward movement of the bail, and just after the eccentric has been compressed, the inturned ends of the bail reach the lower ends of the expanding grooves 27, whereupon they are free to snap into the eyes of the compressed eccentric. Figure 15 shows the position of the parts just before the bail ends have snapped into the eyes of the eccentric, and Figure 16 shows the position of the parts just after the bail ends have snapped into the eyes of the eccentric.

The continued rotation of the cam 18 now permits the spring 25 to elevate the plunger 24. As the plunger rises the portions 34 thereof permit the spring 31 to move outwardly the lower ends of the levers 28. This outward movement releases the pressure on the eccentric and permits the eccentric eyes to move outwardly over the inturned ends of the bail. The completed closure fasteners are now ready to be removed from the uniting apparatus.

For this purpose there is provided a continuously moving endless chain conveyer 36, which is preferably driven from the common driving shaft 17, by means of a sprocket chain 37. At the desired intervals the conveyer is provided with upstanding pairs of lugs or fingers 38. The arrangement is such that just as a closure fastener is completed, a pair of lugs 38 engage the loop of the eccentric and carry the completed fastener forward, the eccentric portion passing under the leaf spring 9, and the bail portion riding down the upper surface of the spring.

Of course the apparatus operates with great rapidity, and for the purpose of steadying the fasteners on the plate 39, as they are carried forward by the conveyer 36, there is preferably provided a rail 40 which, in the specific embodiment illustrated, is so positioned that it extends between the laterally spaced lugs or fingers 38, as shown in Figure 12. Thus the completed closure clamps or fasteners are steadied as they are carried forward on the plate 39, and they are also uniformly positioned on the plate because the downwardly projecting portions of the fasteners travel along the edges of the plate, as shown in Figures 1, 11, 12 and 13.

The completed fasteners are preferably delivered to a stacking device of special construction and operation, by which the fasteners are stacked in the form of packages, ready for future use. Such assembling and stacking device forms no part of the present invention, and is therefore neither illustrated nor described.

The preferred embodiment of the invention, and the operation thereof, will be fully understood from the foregoing description. And it will be apparent that the apparatus will rapidly and efficiently unite the bails and eccentrics, to form complete closure fasteners or clamps.

While the particular apparatus disclosed, has been described in considerable detail, yet obviously it may be changed and modified in numerous respects, and all such changes and modifications are intended to be included within the scope of the appended claims.

What I claim is:

1. An apparatus for uniting bails and eccentrics to form closure fasteners, including an expanding die, means for associating a bail with the die, means for arranging an eccentric in position to be united with the bail, a pair of levers for compressing the eccentric, and a plunger for moving the bail along the said expanding die and for operating said compressing levers.

2. An apparatus for uniting bails and eccentrics to form closure fasteners, including means for conveying the separate parts to a point where they are to be united, an expanding die for expanding the bails, a pair of levers for compressing the eccentrics, means for so arranging the bails and eccentrics that they will be securely united when released from said die and levers, and a conveyer timed with the uniting apparatus for carrying off the united parts.

3. An apparatus for uniting bails and eccentrics to form closure fasteners, the eccentrics having a loop portion and eyes, and the bails having inturned ends adapted to fit in said eyes, an expanding die, means for positioning the eccentrics so that the eyes are disposed in operative relation to the expanding die, means for delivering a bail to the expanding die, means for forcing the bail over the die to cause the bail ends to snap into the eccentric eyes, and means for engaging the closure fasteners so combined to carry them forward clear of the die.

4. An apparatus for uniting bails and eccentrics to form closure fasteners, the eccentrics having a loop portion and eyes, and the bails having inturned ends adapted to fit in said eyes, an expanding die, a chute for conveying the eccentrics to a point adjacent the expanding die, a stop for positioning the eccentrics so that the eyes are disposed in operative relation to the expanding die, means for delivering a bail to the expanding die, and means for forcing the bail over the die to cause the bail ends to snap into the eccentric eyes.

5. An apparatus for uniting bails and eccentrics to form closure fasteners, the eccentrics having a loop portion and eyes, and the bails having inturned ends adapted to fit in said eyes, a stationary expanding die, a chute for conveying the eccentrics to a point below the stationary die, means for delivering a bail to the die, and means for forcing the bail over the die to cause the bail ends to snap into the eccentric eyes.

6. An apparatus for uniting bails and eccentrics to form closure fasteners, the eccentrics having a loop portion and eyes, and the bails having inturned ends adapted to fit in said eyes, means for delivering the eccentrics in position to be united with the bails, a pair of oppositely disposed levers for compressing an eccentric, means for moving a bail to a position where the inturned ends thereof are aligned with the eccentric eyes, and means for releasing the levers to permit the eccentric to expand into united relation with the bail.

7. An apparatus for uniting bails and eccentrics to form closure fasteners, the eccentrics having a loop portion and eyes, and the bails having inturned ends adapted to fit in said eyes, an expanding die, means for conveying the eccentrics to a point adjacent the expanding die, means for compressing the eccentric, means for forcing a bail over the expanding die to cause the bail ends to snap into the eccentric eyes, and then permitting the eccentric to expand.

8. An apparatus for uniting bails and eccentrics to form closure fasteners, the eccentrics having a loop portion and eyes, and the bails having inturned ends adapted to fit in said eyes, an expanding die, a chute for conveying the eccentrics to a point adjacent the expanding die, a stop for positioning the eccentrics so that the eyes are disposed in operative relation to the expanding die, means for compressing the eccentric, means for forcing a bail over the expanding die to cause the bail ends to snap into the eccentric eyes, and then permitting the eccentric to expand.

9. An apparatus for uniting bails and eccentrics to form closure fasteners, the eccentrics having a loop portion and eyes, and the bails having inturned ends adapted to fit in said eyes, an expanding die, a chute for conveying the eccentrics to a point adjacent the expanding die, means for compressing the eccentric, means for forcing a bail over the expanding die to cause the bail ends to snap in the eccentric eyes, then permitting the eccentric to expand, and means for engaging the closure fasteners so combined to carry them forward clear of the die.

10. An apparatus for uniting bails and eccentrics to form closure fasteners, the eccentrics having a loop portion and eyes, and the bails having inturned ends adapted to fit in said eyes, an expanding die, a chute for conveying the eccentrics to a position below the expanding die, a pair of levers for compressing and releasing the eccentric, and a plunger for forcing a bail over the expanding die to cause the bail ends to snap into the eccentric eyes while the eccentric is compressed.

11. An apparatus for uniting bails and eccentrics to form closure fasteners, the eccentrics having a loop portion and eyes, and the bails having inturned ends adapted to fit in said eyes, an expanding die, a chute for conveying the eccentrics to a point below the expanding die, a pair of levers for compressing and releasing the eccentric, a plunger movable downwardly to force a bail over the expanding die, and the downward movement of the plunger causing the said levers to move inwardly.

12. An apparatus for uniting bails and eccentrics to form closure fasteners, the eccentrics having a loop portion and eyes, and the bails having inturned ends adapted to fit in said eyes, bail expanding means, means for positioning the eccentrics so that the eyes are disposed in operative relation to the bail expanding means, means for delivering a bail to the bail expanding means, the inturned bail ends snapping into the eccentric eyes after the bail expanding means has expanded the bail, and means for carrying off the closure fasteners so combined.

13. An apparatus for uniting bails and eccentrics to form closure fasteners, the eccentrics having a loop portion and eyes, and the bails having inturned ends adapted to fit in said eyes, means for delivering the eccentrics in position to be united with the bails, means for compressing an eccentric, means for moving a bail to a position where the inturned ends thereof are aligned with the eccentric eyes, and means for releasing the compressing means to permit the eccentric to expand into united relation with the bail.

FRANK REDMAN.